(12) United States Patent
Haupt et al.

(10) Patent No.: US 11,480,738 B2
(45) Date of Patent: Oct. 25, 2022

(54) OPTICAL FIBER BASED ORGANIC CANTILEVER WITH INTEGRATED TRANSDUCTION

(71) Applicants: Université de Bordeaux, Bordeaux (FR); Institut Polytechnique de Bordeaux, Talence (FR); Centre National de la Recherche Scientifique, Paris (FR); Université de technologie de Compiègne, Compiegne (FR)

(72) Inventors: Karsten Haupt, Pronleroy (FR); Cédric Ayela, Pessac (FR); Frank Bokeloh, Bordeaux (FR)

(73) Assignees: UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR); UNIVERSITÉ DE TECHNOLOGIE DE COMPIÈGNE, Compiegne (FR)

( * ) Notice: Subject to any disclaimer, the term of this patent is extended or adjusted under 35 U.S.C. 154(b) by 130 days.

(21) Appl. No.: 16/769,532

(22) PCT Filed: Dec. 10, 2018

(86) PCT No.: PCT/EP2018/084237
§ 371 (c)(1),
(2) Date: Jun. 3, 2020

(87) PCT Pub. No.: WO2019/110849
PCT Pub. Date: Jun. 13, 2019

(65) Prior Publication Data
US 2020/0333536 A1    Oct. 22, 2020

(30) Foreign Application Priority Data

Dec. 8, 2017 (EP) .................................... 17306732
Mar. 16, 2018 (EP) .................................... 18162383

(51) Int. Cl.
*G02B 6/36* (2006.01)
*G01D 5/353* (2006.01)

(52) U.S. Cl.
CPC ....... *G02B 6/3624* (2013.01); *G01D 5/35354* (2013.01)

(58) Field of Classification Search
CPC .. G02B 6/3624; G02B 6/262; G01D 5/35354; G01D 5/26; G01H 9/006
See application file for complete search history.

(56) References Cited

U.S. PATENT DOCUMENTS

| 4,414,471 A | 11/1983 | Rines |
| 5,832,157 A | 11/1998 | Berthold et al. |

FOREIGN PATENT DOCUMENTS

| GB | 2215055 A | | 9/1989 |
| JP | 2015-508685 | * | 3/2015 |

(Continued)

OTHER PUBLICATIONS

European Patent Office, Extended European Search Report received for Application No. 181623 83.6, dated Oct. 10, 2018, 7 pages, Germany.

(Continued)

*Primary Examiner* — Tony Ko
(74) *Attorney, Agent, or Firm* — BakerHostetler

(57) ABSTRACT

The present invention relates to a sensor device comprising an optical fiber to be coupled with a laser beam, a through-fiber fabricated cantilever onto one end of said optical fiber, and a light collector. According to the invention, the through-fiber fabricated cantilever is made of a polymer (Continued)

obtained by photo-structuring at least one photo-sensitive monomer species. The present invention also relates to methods for the measurement of parameters such as temperature, mass, viscosity, analyte concentrations, and the degree of a polymerization process, using the device of the invention.

9 Claims, 7 Drawing Sheets

(56) References Cited

FOREIGN PATENT DOCUMENTS

| | | |
|---|---|---|
| WO | 0013004 A2 | 3/2000 |
| WO | 2019110849 A1 | 6/2019 |

OTHER PUBLICATIONS

Foreign Communication from a Related Counterpart Application, International Search Report and Written Opinion dated Feb. 26, 2019, International Application No. PCT/EP2018/084237 filed on Dec. 10, 2018.

* cited by examiner

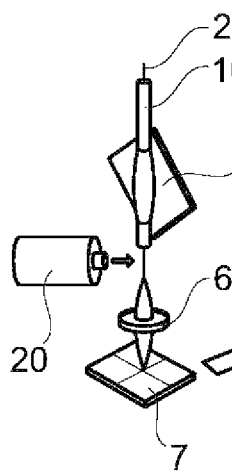
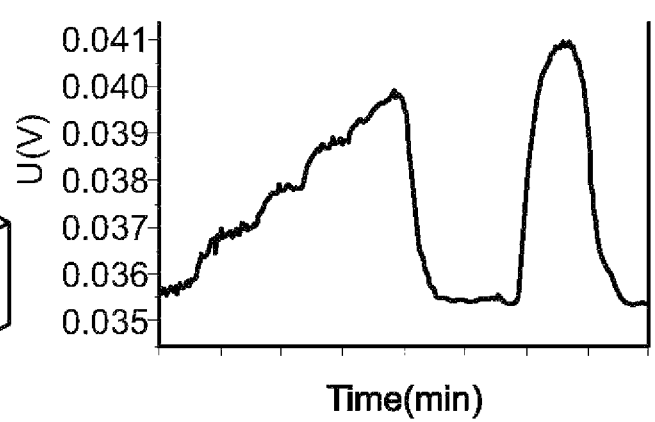
Fig. 3a        Fig. 3b
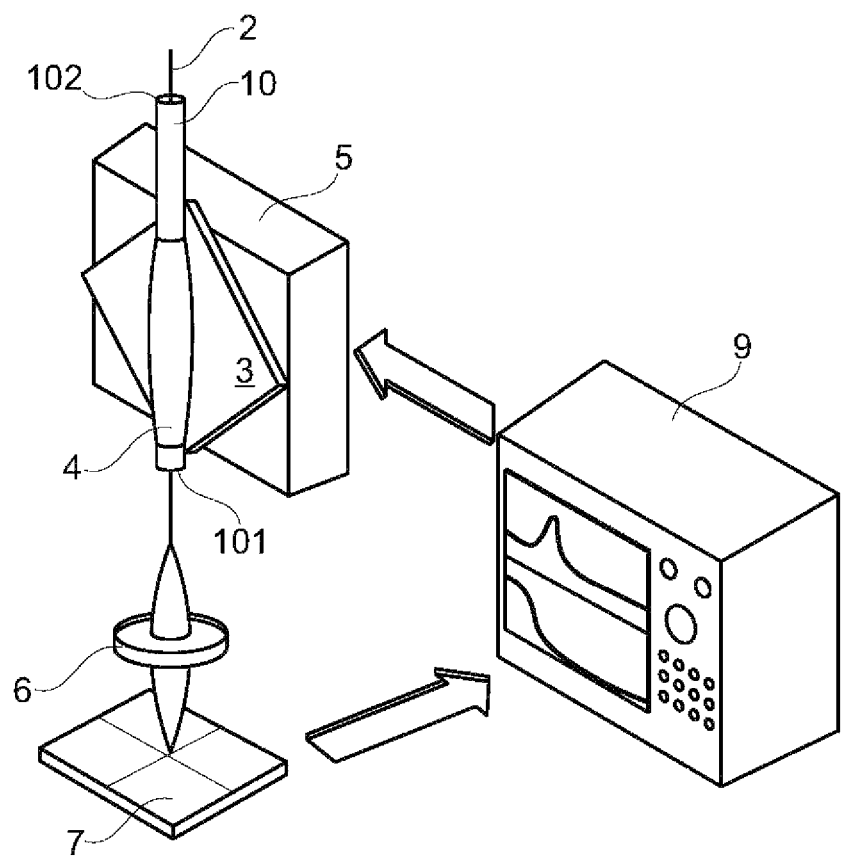
Fig. 4

OPTICAL FIBER BASED ORGANIC CANTILEVER WITH INTEGRATED TRANSDUCTION

CROSS-REFERENCE TO RELATED APPLICATIONS

The present application is a filing under 35 U.S.C. 371 as the National Stage of International Application No. PCT/EP2018/084237, filed Dec. 10, 2018, entitled "Optical Fiber Based Organic Cantilever with Integrated Transduction," which claims priority to European Application No. 18162383.6 filed with the Intellectual Property Office of Europe on Mar. 16, 2018 and European Application No. 17306732.3 filed with the Intellectual Property Office of Europe on Dec. 8, 2017, all of which are incorporated herein by reference in their entirety for all purposes.

The present invention relates to the field of organic microelectromechanical sensors based on fiber optics, in particular comprising a through-fiber fabricated cantilever. The fabrication of polymer tips by means of through-fiber fabrication and the feasibility for sensing applications have already been described.

Through-fiber fabricated cantilever can be analyzed by standard read-out methods such as a vibrometer. Vibrometer enables reliable dynamic studies of a cantilever beam with a frequency resolution of less than 1 Hz. The vibrometer used is a commercial available device and makes the analysis quite straight forward for the user. However, the use of a vibrometer might be inconvenient since the equipment is rather expensive and makes the experimental set-up rather bulky. Furthermore, the analysis of through-fiber fabricated cantilever beams is limited to applications in air or vacuum.

The present invention relates to an integrated read-out scheme for these polymer cantilevers and gives access to new sensing and characterization studies. Therefore, a laser beam is coupled into the optical fiber and guided through the attached cantilever. The emerging light is then collected with appropriate means, for instance with a lens and a 4-quadrant avalanche photodiode. This integrated read-out concept paves the way towards a fully integrated set-up. In this context is the use of the optical fiber especially appealing, since remote operations in particular in harsh environments become accessible.

A first object of the present invention is a sensor device comprising an optical fiber to be coupled with a laser beam, a through-fiber fabricated cantilever onto one end of said optical fiber and having one free end, and a light collector such as a photodiode, characterized in that said through-fiber fabricated cantilever is a patterned cantilever made of a polymer obtained by photo-polymerization of at least one photo-sensitive monomer.

By patterned, it is meant, in the sense of the present invention a fabricated cantilever by photo-structuring (or photo-polymerizing) photo-sensitive monomers.

The through-fiber fabricated cantilever of the sensor device of the invention is thus made of polymer tips and may be used as cantilever beams operated in dynamic or static mode.

The through-fiber fabricated cantilever of the sensor device of the invention preferably presents a length between 10 microns and 200 microns, preferably comprised between 80 and 200 microns.

The through-fiber fabricated cantilever of the sensor device of the invention preferably presents a diameter comprised between 5 and 25 microns, preferably around 10 microns. For instance, the diameter of the through-fiber fabricated cantilever is equal to the core of the optical fiber or is confined by the core of the optical fiber.

The examples of dimensions of the through-fiber fabricated cantilever are non-limitative ones.

The through-fiber fabricated cantilever of the sensor device of the invention may comprise any photopolymerizable material, for instance pentaerythritol triacrylate (PETIA) or a functional polymer, such as molecularly imprinted polymers (MIPs).

In a first embodiment of the invention, at least part of the free end of the through-fiber cantilever of the cantilever sensor device of the invention is treated with a coating chosen among a metal or a polymer.

In a second embodiment of the invention, the free end of the through-fiber cantilever of the cantilevered sensor device of the invention is not treated with a coating allowing the incoming light to be reflected.

Another object of the present invention is a method for the measurement of at least one parameter with the sensor device according to the invention, said method comprising the following steps:

a. Injecting a laser beam into the optical fiber of the sensor device;

b. Measuring the light intensity of the light reflected from the through-fiber fabricated cantilever with a photodiode.

Yet another object of the present invention is a method for the measurement of at least one parameter with the sensor device according to the invention, said method comprising the following steps:

a. Injecting a laser beam into the optical fiber of the sensor device;

b. Collecting the light emerging from (in the sense of transmitted by) the free end of the through-fiber fabricated cantilever, and c. Analyzing the emerging light (in the sense of collected by) to determine the value of the said at least one parameter.

Examples of parameters that can be measured according to these methods may be temperature, mass, viscosity of liquids, analyte concentrations, and the degree of a polymerization process.

The measurement of these parameters and others can be achieved through measurement of the displacement or deflection, the shift of resonant frequency, or the quality factor of the cantilever, followed by the analysis of the obtained data.

The measurement of at least one parameter according to the invention can be performed either in static mode or in dynamic mode.

The sensor device of the invention may also comprise a plurality of through-fiber cantilevers, optionally made of different material, for instance different polymers. The plurality of through-fiber cantilevers comprises at least two through-fiber cantilevers, preferably at least three, at least four, at least five, more preferably at least ten, and even more preferably at least fifty through-fiber cantilevers. In said embodiment, the plurality of through-fiber fabricated cantilevers may be present on one optical fiber with multiple cores, or on a bundle of optical fibers, the optical fibers may be comprised in the same sheath or jacket.

Online measurements are of great interest for sensing applications and can give access to additional kinetic informations of the binding process of functional polymer materials such as molecularly imprinted polymers (MIPs). Online measurements in liquid media with cantilever sensors are a challenging task due to the viscous damping of surrounding media.

Advantages of presented invention are the miniaturization and/or simplification of the read-out, the possibility of remote operation (for harsh environments or very small samples) and the possibility to operate online measurements in liquid and/or viscous media.

DESCRIPTION OF THE FIGURES

FIG. 3: (3a) Experimental set-up, an air stream is directed against the cantilever, the strength of the air stream is gradually changed and the output signal obtained from the photodiode (3b) is analyzed with an oscilloscope;

FIG. 4: Integrated transducer concept: A laser is guided through the optical fiber cantilever beam and focused with a lens on a position sensitive 4-quadrant avalanche photodiode. The signal from the photodiode was processed by a network analyzer and coupled with the actuation of the PZT element;

EXAMPLES

Figure 1:
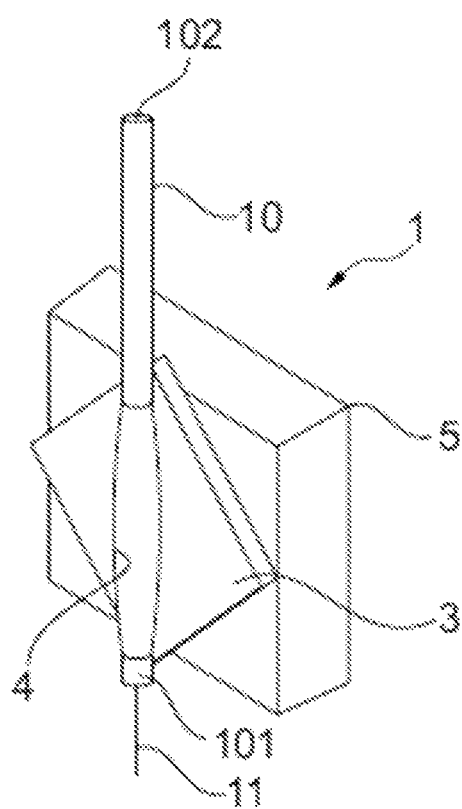
FIG. 1: Through-fiber patterned or fabricated cantilever beam fixed on a PZT actuator.

Materials and Methods a. Materials, Chemicals, Devices

All chemicals and solvents were of analytical grade and purchased from Sigma-Aldrich or from VWR international, unless otherwise stated. Bis(2,4,6-trimethylbenzoyl)-phenylphosphineoxide (Irgacure 819) was generously provided by Ciba Specialty Chemicals (Saint Fons, France). SU-8 3050 and SU-8 3005 was obtained from MicroChem. Microscopic cover glasses (15 mm×15 mm) by Menzel were used as substrates. The optical fiber, a single mode optical fiber (SMF 28) and optical elements were provided by THORLABS or custom made. Piezo linear actuators were purchased from PI piezo technology (model: PL022.30).

For photo-polymerization a 375 nm laser by oxxius (lbx-375-70) was used.

The intensity of the laser output was measured with a power meter (maestro) from Gentec-EO. A He—Ne laser tube (HRP 050), and 4-quadrant photodetector from THORLABS and a network analyser (E5061B) by Agilent Technologies were used for the read-out.

b. Through-Fiber Fabrication of Cantilever Beams 11

All presented studies in this chapter were carried out with a through-fiber fabricated cantilever beam 11.

The cantilever beam was made from the trifunctional monomer pentaerythritol triacrylate (PETIA) mixed with 50% wt acetonitrile and 1% mol (of polymerizable groups) initiator bis(2,4,6-trimethylbenzoyl)-phenyl phosphine oxide.

The optical fiber 10 was attached to a glass substrate 3 with SU-8 (cured by UV light (365 nm) for 60 minutes and post exposure bake over night at 100° C.) 4 before the polymer structure was polymerized. The glass support 3 with the end of the fiber 10 was than fixed with adhesive tape on a PZT actuator 5. A 375 nm laser source 2 was than coupled into the optical fiber and a poly(PETIA) cantilever beam 11 was fabricated. The length of the cantilever 11 was fixed to ~200 μm.

Resulting through-fiber fabricated cantilever beam 11 fixed on a PZT actuator 5 can be seen in FIG. 1.

c. Read-Out Set-Up

Figure 2:
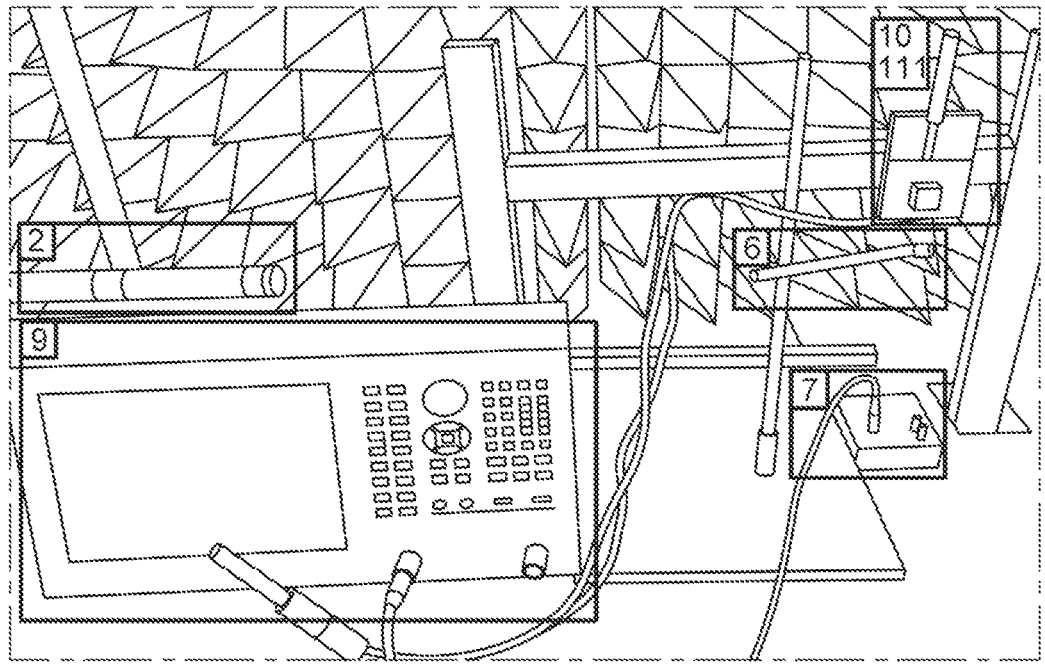
FIG. 2: Set-up for the integrated read-out of through-fiber patterned or fabricated cantilever beams.

For the integrated optical read-out of resonating cantilevers, a He—Ne laser 2 was coupled through the fiber 10 and cantilever beam 11 (see FIG. 2). Emerging light was collected with a lens 6 and focused on a 4-quadrant avalanche photodiode 7. A network analyzer (9) was coupled with the photodetector and with the PZT actuator 5.

d. Characterization of Poly(PETIA) Cantilever Structures

Temperature studies have been carried out by bringing a Peltier element and a digital thermometer close to the cantilever beam and changing the temperature gradually.

The photothermal effect was evaluated by modifying the laser intensity of the He—Ne laser with an optical filter.

The mass sensitivity of the cantilever beams was evaluated by dissolving polystyrene (Mw: ~280000 g/mol) in tetrahydrofuran (THF). The tip (~20 μm) of the cantilever beam was carefully dipped in the solution. After removing the cantilever from the solution, a polystyrene droplet formed at the tip of the cantilever. The mass was evaluated after the solvent of this droplet evaporated (1 hour drying on air).

For measurements in liquid, a droplet of the liquid media of interest was put on a microscopic glass slide. The cantilever was then carefully brought into contact with the droplet by adjusting the position with a micropositioner until the whole cantilever was immersed by the liquid environment.

For measurements in liquid media with varying mass density and viscosity water with increasing concentrations of ethylene glycol (0%, 20%, 40%, 60%, 80%, 100% (wt)) was used.

Example: Through-Fiber Fabricated Organic Micro-Cantilever with Integrated Transduction Scheme a. Set-Up Development and Implementation In this section a novel, integrated read-out scheme for through-fiber patterned or fabricated microcantilevers is proposed.

This innovative concept employed a 632 nm He—Ne laser coupled into the optical fiber 10 with attached polymer beam, and a 4-quadrant avalanche photodiode 7 as central elements for the transduction. Position sensitive photodiodes are the most common transducer scheme in commercial available AFMs. This can be addressed to their high sensitivity, and the excellent signal to noise ratio. For the conventional optical beam deflection method, a monochromatic laser beam is reflected from the cantilever surface and thereby projects the cantilever motion on the sensor surface. The motion of the laser beam is amplified by the distance the light has to travel from the cantilever surface towards the photodiode and thus allows a resolution on the nanometer scale.

Another appealing optical read-out concept is based on waveguide cantilever. Here, a monochromatic light beam is coupled into a slab waveguide which acts as a single clamped cantilever. From the end of the waveguide cantilever the emerging light is coupled into a second cantilever, by measuring the coupling efficiency (light intensity of the out-put) the beam deflection can be calculated.

Introduced read-out concept of the invention is based on these two approaches of optical beam deflection and waveguide coupling read-out.

In a first experiment, the feasibility of transducing the cantilever motion with the position sensitive photodiode was tested with a simplified set-up, illustrated in FIG. 3 (3a). A 632 nm He—Ne laser 2 was coupled through the optical fiber 10 and attached cantilever beam 11 (poly(PEITA)). The emerging light was collected with a lens 6 and focused on a 4-quadrant avalanche photodiode 7, from where the output signal was analyzed with an oscilloscope. In this first proof of concept a motion of the cantilever was forced by an external physical stimulus. An air-jet (nitrogen flow) 20 was directed against the cantilever beam and the cantilever motion recorded with described equipment. FIG. 3b (shows the output signal of the oscilloscope 8 for a varying air-flow.

Recorded signal of the oscilloscope 8 (FIG. 3 (right)) shows a change of the voltage over time and therefore proved the sensitivity of the read-out scheme towards motions of the cantilever beam. The set-up presents an interesting concept for the read-out of static mode operated cantilevers, since it allows to record the bending of a cantilever beam in real time. However, for the analysis of static cantilever motion the system requires a more controlled experimental set-up. For comparable results the distance between photodetector and cantilever beam needs to be precisely controlled since the deflection on the sensor surface and therefore the output signal depends on this distance (trigonometric relationship). Furthermore, requires the laser-spot position on the photodiode a calibration for comparable results, since the response of used 4-quadrant photodiode is not linear.

For the transduction of through-fiber fabricated microcantilevers in dynamic mode, the presented read-out scheme needed two adjustments. The cantilever required an actuation impulse which was applied by an external piezo element and the oscilloscope was replaced by a gain-phase network analyzer 9. The integrated optical transducer concept is illustrated in FIG. 4.

However, the actuation impulse can also be generated by an intensity modulated light beam coupled into the optical fiber with attached through-fiber fabricated cantilever.

In theory, an oscilloscope should be also able to display the motion of the cantilever in the frequency domain since most modern oscilloscopes provide an integrated Fast Fourier Transform (FFT) algorithm. However, in presented case a gain-phase network analyzer 9 was employed and analyzed the output voltage by synchronizing the piezo actuator with the photodiode. This instrument 9 introduced a frequency sweep to the cantilever beam 11 (via the PZT actuator 5) and compared the input signal with the output signal obtained from the position sensitive photodiode. At resonance, the output signal varied from the input signal, and thus determined the resonant frequency of the cantilever beam.

For the experimental set-up, a calibration of the laser position on the photodiode was not necessary since the set-up was used in dynamic mode. Changing the position of the laser spot on the photodiode only resulted from changed amplitude of the signal without shifting the resonant peak, which made the use of the experimental set-up quite straight forward.

Figure 5A:
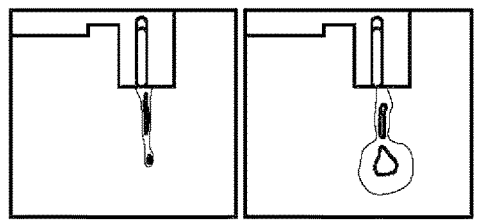
FIG. 5: (5a) Through-fiber fabricated or patterned cantilever beam attached to glass substrate; (middle) cantilever beam with a He/Ne laser guided through (scale bar represents 150 μm); (5b) resonant frequency and corresponding phase of presented cantilever beam.
Figure 5B:
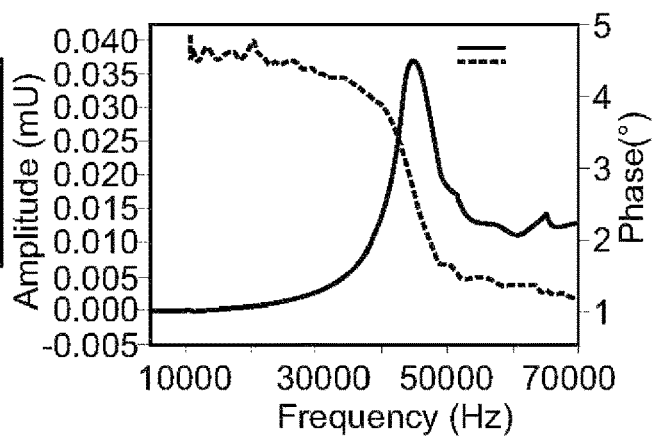

In FIG. 5 a cantilever beam and corresponding frequency spectrum obtained with the integrated set-up are presented. From FIG. 5a it can be seen that the He/Ne laser was mostly guided though the cantilever beam and exits at the end of the structure. From there it was collected with a lens and focused on the position sensitive photodetector. FIG. 5b shows the untreated resonant frequency spectra with corresponding phase obtained from the gain-phase network analyzer. It proves that the built set-up was sensitive enough to resolve smallest motions (on the nanometer scale) of the cantilever and thus allowed the characterization of the dynamic response without employing the laser-Doppler vibrometer. This can be seen as a remarkable step towards a fully integrated and miniaturized set-up.

Figure 6:
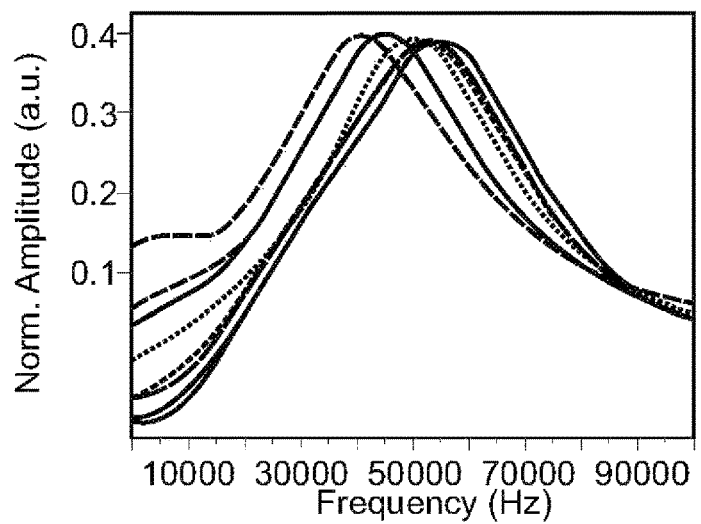
FIG. 6: Frequency spectra recorded with increasing temperature regime.

The resonant frequency of presented sample (length: 213 μm; diameter: 11 μm) was found at 44.6 kHz, which resulted, according to equation 1, in a Young's modulus of 2.1 GPa (assuming a mass density of 1100 kg/m$^3$).

$$E_1 = \frac{4\pi^2 f_n^2 L^4 12 \rho_1}{\lambda_n^4 h_1^2}(1 - v_1^2) \tag{1}$$

b. Characterization of the Through-Fiber Fabricated Cantilever Towards Temperature Changes and Light-Induced Photothermal Effects The influence of the temperature on the dynamic behaviour of through-fiber fabricated cantilever beams is an excellent parameter for characterization studies, since obtained data can be compared with known values. The frequency spectrum was therefore recorded with the integrated set-up while placing a Peltier element and digital thermometer close to the cantilever beam and increasing gradually the temperature. The frequency spectrum of the cantilever was continuously recorded. FIG. 6 shows the obtained spectra.

As expected was the resonant frequency decreasing with increasing temperature. The slope of the linear fit was calculated to −0.12% f/° C. with an R2=0.9366.

Regarding thermal effects, it is important for presented read-out scheme to investigate how the guided light of the He—Ne laser affects the cantilever beam and its dynamic behaviour. It is well known and described in literature that light can affect the motion of a cantilever beam either by the radiation pressure or by a photothermal effect induced by absorbed light.

Figure 7:
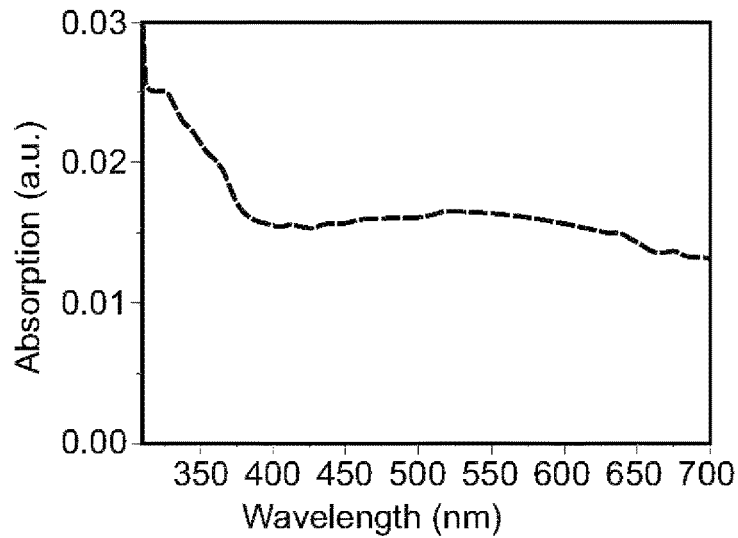
FIG. 7: UV/Vis spectrum of poly(PETIA)

In order to investigate the influence of the He/Ne laser irradiation on the poly(PETA) cantilever material, an absorption spectrum of poly(PETIA) was taken. Therefore, a poly(PETIA) film was spin-coated on a glass slide, polymerized, and a UV/Vis spectrum was taken (FIG. 7). As expected, the transparent polymer showed very little absorption in the visible range (~400-700 nm). The photothermal effect was therefore expected to be at a minimum. However, a small amount of light is always absorbed by each material and can result in temperature variations.

Figure 8:
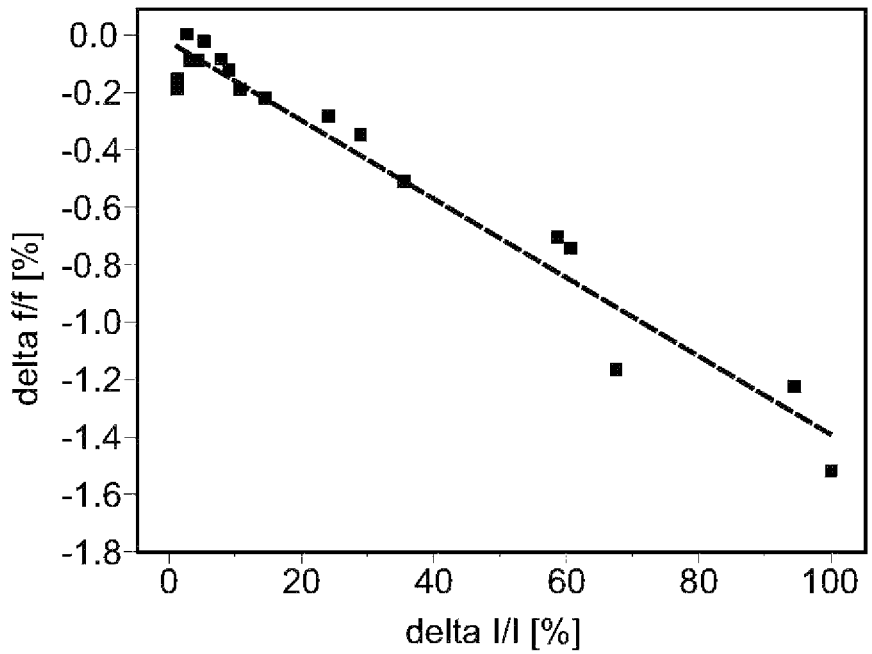
FIG. 8: Relative change of the resonant frequency as a function of the (relative) light intensity of the probe laser.

The influence of the probe light intensity on the dynamic behaviour of the through-fiber fabricated cantilevers was tested by changing gradually the light intensity of the He/Ne probe laser while monitoring the resonant frequency. The results are presented in FIG. 8.

The resonant frequency of through-fiber fabricated cantilever beams decreased linearly with increasing light intensity. The resonant frequency recorded with the lowest possible amount of light intensity (that still allowed to record a frequency spectrum) showed a difference of 1.5% compared with the resonant frequency obtained with a maximum light intensity. It should be noted that the total value of light intensity introduced into the structure was difficult to obtain since not the complete light emerged from the cantilever. Thus, the relative light intensity was plotted on the x-axis in FIG. 8. However, the maximum output which could be obtained from the optical fiber (without cantilever) was found at 2 mW which should be close to the 100% value.

The observed frequency shift can very likely be attributed to a photothermal effect, since the radiation pressure is a very weak effect. In a study of Allegrini and co-workers the radiation pressure of a perpendicular incident light beam ($\lambda$=670 nm) with an intensity of 7 mW was calculated to be $1.6 \times 10^{-11}$ N.3 Since in our study the light beam was in plane with the cantilever beam and the used laser source was weaker, the effect of radiation pressure should be even lower and thus can be neglected. By inserting the maximum delta f/f value of 1.5% into the linear fit derived from the temperature dependent measurement (FIG. 6a), the laser induced heat was calculated to be $\Delta T$=4.7° C.

The probe laser-induced photothermal effect is an important parameter to validate. For precise measurements over long periods of time and for comparable studies it needs to be assured that the laser irradiation power remains constant, or that recorded values are corrected (according to the laser intensity).

c. Characterization of the Polymerization Process of the Through-Fiber Fabricated Cantilever Beams In the following experiment the post cross-linking process of two cantilever beams was monitored online.

Therefore, two cantilever beams 11 (l1: 195 μm, d1: 11 μm and l2: 260 μm, d2: 11 μm) were fabricated with an exposure power of 2 μW (I: 0.16 mW/cm2) and an exposure time of 6 seconds. After fabrication, the cantilever 11 was coupled to the 632 nm He/Ne laser 2 and the resonant frequency was measured. The cantilever 11 was then coupled back to the 375 nm laser 2 (I: ~1.6 mW/cm²) for further cross-linking.

Figure 9A:
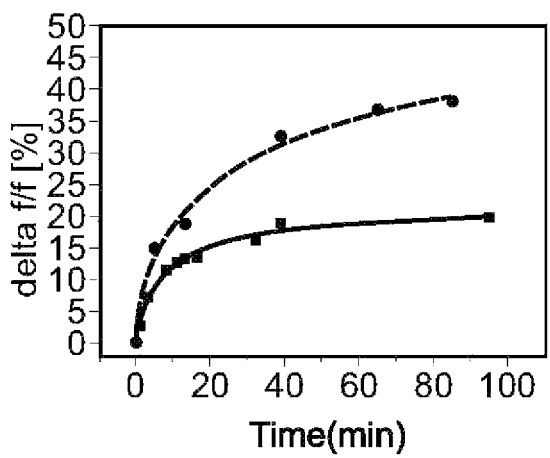
FIG. 9: (9a) Resonant frequencies as a function of irradiation time at 375 nm; (9b) recorded resonant frequencies of beam 1 and beam 2 and resulting Young's modulus.
Figure 9B:
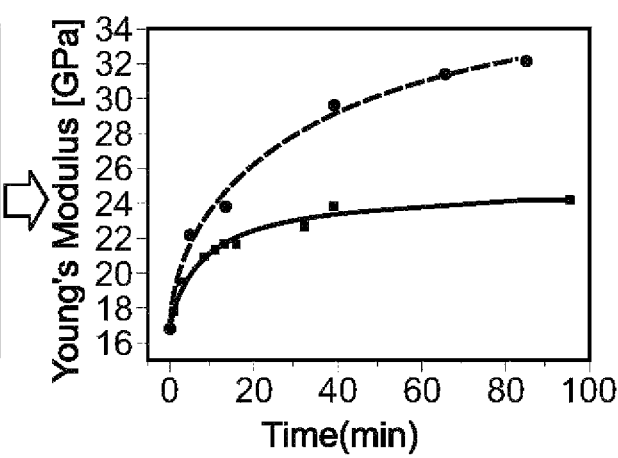

During this process, the resonant frequency was recorded multiple times. The results are presented in FIG. 9. The resonant frequency of through-fiber fabricated cantilever beams increased drastically with further irradiation time and intensity. A plateau was reached for both structures after an irradiation time of ~60 minutes.

The increase of the resonant frequency might be slightly influenced by a drying process of the cantilever after unreacted monomers were washed away with ethanol. However, this effect cannot be the main driving force. The big frequency shift can more likely be attributed to further cross-linking of the polymer structure. After the main polymerization process (forming the cantilever beam) many pending chains are still available. These remaining double bonds were activated by the UV irradiation and further cross-linked, resulting in an increasing stiffness. This dynamic process is commonly analyzed by vibrational spectroscopy via the disappearing of the characteristic double bond peak. The difference between the two structures might be caused by slightly varying polymerization conditions. The structures were multiple times coupled from the 375 nm UV laser to the 632 nm probe laser and vice versa. Therefore, the polymerization intensity of both structures changed and might be not comparable with each other.

d. Mass Sensitivity of the Through-Fiber Fabricated Cantilever

Cantilever sensors operated in dynamic mode are, as pointed out before, highly mass sensitive devices. The experimental validation of the mass sensitivity of cantilever beams at the micro-scale is challenging, since a defined mass has to be added to the cantilever, without changing the mechanical properties of the cantilever.

Figure 10:
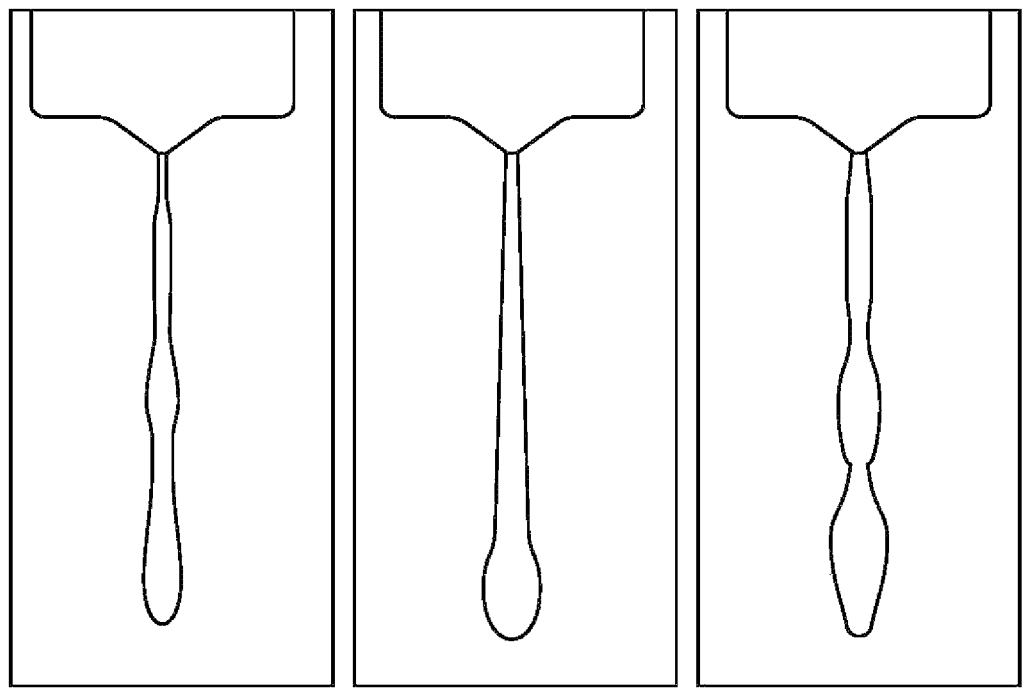
FIG. 10: through-fiber patterned or fabricated cantilever with added polystyrene mass at the cantilever tip; left: unloaded; middle and right: with polystyrene mass M1 and M2 respectively (scale bar=125 μm)

For inorganic materials with high Young's modulus this might be achieved by thermal evaporation of a defined polymer layer, since the influence of the low Young's modulus of the organic material on the stiffness of the cantilever can be neglected. However, for presented organic cantilever beams the deposition of a thin film over the complete length of the cantilever is believed to interfere with the stiffness and therefore not only the mass but also the mechanical properties of the cantilever would change, which makes an evaluation of one of the two parameters challenging. Thus, in the presented experiment a point mass was added to the end of the cantilever, by dipping the cantilever tip in polystyrene dissolved in tetrahydrofuran (THF). After pulling the cantilever carefully out of this solution a little drop formed at the end of the cantilever and hardened after the volatile solvent THF evaporated (FIG. 10).

The resonant frequency of the first fundamental mode of a cantilever beam characterized by its Young's modulus E, length L, mass Mb and additional point mass M at the end of the beam can be calculated by Equation 2:

$$f_1 = \frac{1}{2\pi} \sqrt{\left(\frac{3EI}{L^3(M + 0.24M_b)}\right)} \quad (2)$$

I is the geometry-dependent second moment of area and can be expressed for an ideal cylinder by:

$$I = \frac{\pi R^4}{4} \quad (3)$$

The unloaded cantilever characteristics were evaluated to be:
Length: 234 μm
Diameter: 10 μm
Young's Modulus: 2.2 GPa
Resonant frequency: 35983 Hz
Mass cantilever (Mb): 20.26 ng ($2.026 \times 10^{-11}$ kg)
Mass polystyrene 1 (PS1): 4.18 ng ($4.18 \times 10^{-12}$ kg)

Mass polystyrene 2 (PS2): 23.8 ng (2.38×10-11 kg.

The Young's modulus was evaluated by solving equation 1 (solution of the

Euler-Bernoulli beam equation). The mass of the cantilever was calculated by assuming a mass density of 1100 kg/m³. Attached polystyrene masses were extrapolated from the microscopy images (FIG. 10) by assuming a mas density of 1047 kg/m³ (value obtained from product data sheet). Theoretical frequency values and experimentally obtained values are summarized in Table 1.

TABLE 1

| f exp [kHz] | f (theor) [Hz] | data $f_{exp}/f_{theor}$ [%] | M (exp) [kg] | M (theor) [kg] | delta $M_{exp}/M_{theor}$ [%] |
|---|---|---|---|---|---|
| 36 | — | — | — | — | — |
| 29.4 | 25.7 | 12 | 4.7E−12 | 2.51E−12 | 53 |
| 20.5 | 15.2 | 26 | 2.3E−11 | 1.04E−11 | 46 |

Figure 11:
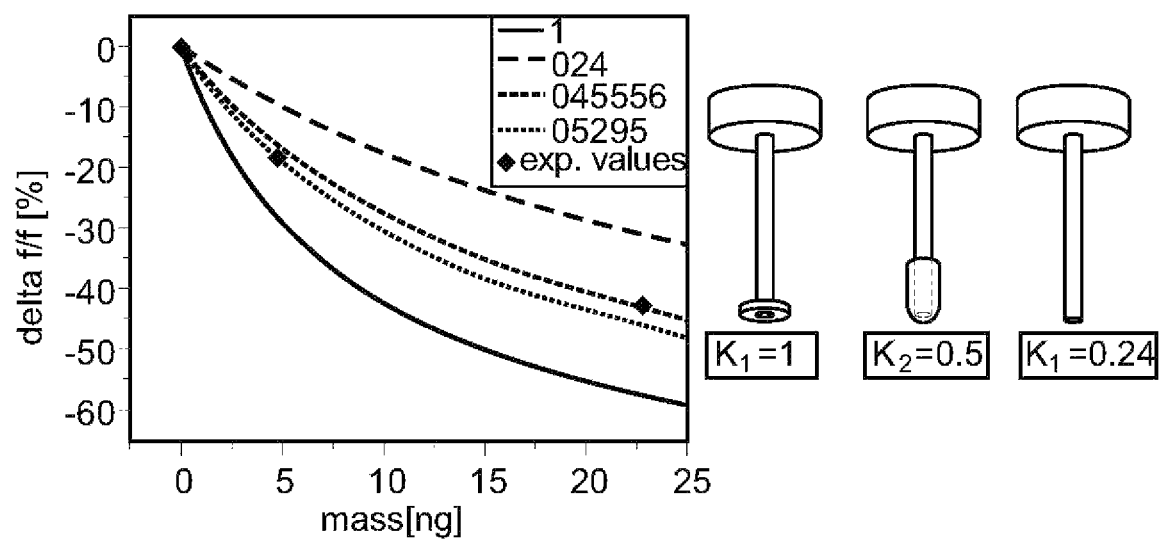
FIG. 11: Theoretical frequency response to an attached endpoint mass (black) and the mass distributed over the length of the cantilever; green diamonds are the experimental obtained values (left); corresponding mass distribution over the length of a cantilever (right)

Theoretical and experimental obtained resonant frequencies of polystyrene point masses attached to cantilever tip It should be noted that Equation 2 is an approximate equation, which was derived using the energy (Rayleigh) technique. However, results using this equation should be within about 1% of the exact solution.8 The difference of the resonant frequency for the unloaded cantilever beam (calculated by Equation 2) towards the measured value was found to be 0.55%. The errors of ~50% between the mass calculated from obtained resonant frequencies and the mass evaluated from microscopy images can be attributed to two effects. First, the end-point mass was evaluated by assuming a rotational symmetric shape with a uniform density of 1047 kg/m³. An error might have occurred by validating the volume of the mass from the microscopy images. Second, it should be noted that Equation 2 is only valid for end-point masses. As it can be seen from the microscope images the polystyrene mass was covering ~50 μm (sample M1) and ~80 μm (sample M2) of the cantilever beam, corresponding to 21% and 34% of the total cantilever length. Therefore, the mass term of Equation 2 requires a correction factor κ (κM+0.24 Mb), with a value between 1 (endpoint mass) and 0.24 (distributed mass covers complete length of the cantilever). This value κ is a non-linear value and was found in the presented study to be 0.5295 and 0.45556 respectively. Both values are in agreement with the theory (0.24<κ<1). The analysis of point masses and their position on a cantilever beam was already investigated by several groups9-11 with more advanced analytical models. In 2015 Heinrich and Dufour presented a theoretical study derived from the Bernoulli-Euler beam theory. This study took not only the adsorbate-mass and position on the cantilever beam into account, but also the influence of the rotational inertia of the attached particle and its eccentricity with respect to the neutral axis of the beam 12. However, the presented case is more complex since the added mass is not a point mass but, as discussed, a distributed mass that covers up to 30% of the cantilever length. Furthermore, the mass shape is not uniform over this distance and the overall stiffness of the structure may be influenced as well by the added mass. In FIG. 11 the effects of a concentrated endpoint mass (black graph; factor κ=1) and a mass distributed over the complete length of the cantilever (red graph; factor κ=0.24) are visualized. Measured frequency values for the microscopic evaluated masses are within these extreme values (green diamonds).

For small mass variations (0 ng <m<3 ng) the frequency response can be considered linear and resulted in a mass sensitivity of −1.8 Hz/pg for the cantilever with a distributed mass of 21% (PS2) over the length of the cantilever and −1.6 Hz/pg for the cantilever with a distributed mass of 34% (PS1) over the length of the cantilever. For organic cantilever beams this mass sensitivity is quite remarkable and shows comparable values with silicon cantilevers of similar dimensions. Wang et al. reported in 2016 of silicon microcantilevers (150-300 μm long; 50-100 μm wide, and 5 μm thick) resonating at 200-300 kHz (Q: 531 in air) with a mass sensitivity of 2.3-3.5 Hz/pg.

e. Operation of the Through-Fiber Fabricated Cantilever Beam in Water

Figure 12:
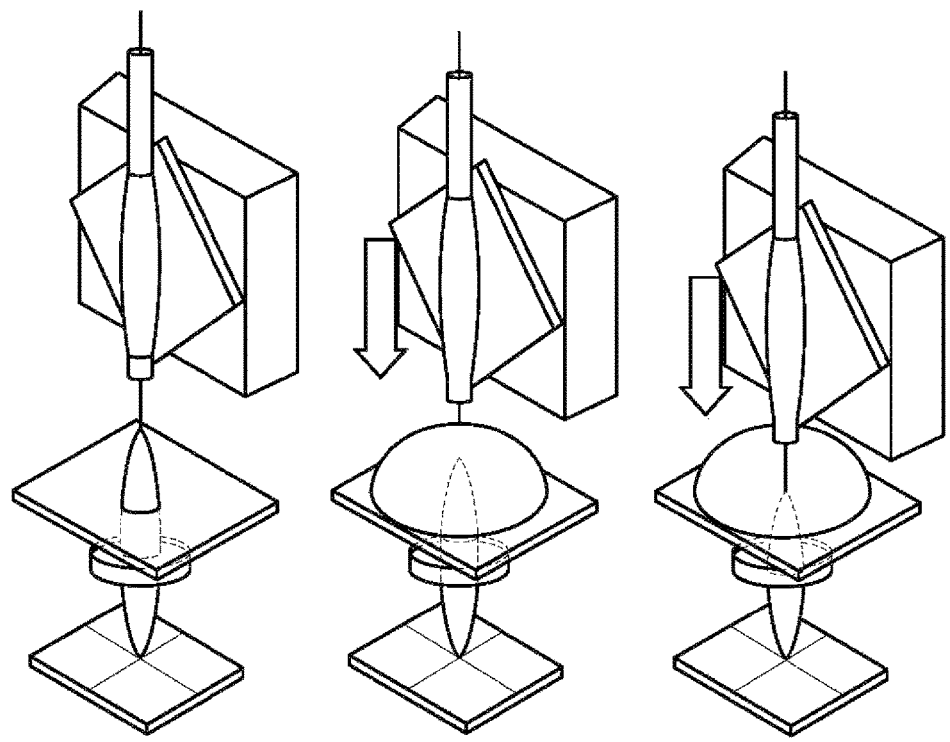
FIG. 12: (top) Illustration of the set-up for measurements in liquid. The cantilever beam is slowly brought into the liquid. (down) Amplitude and phase of resonant frequencies obtained for measurement in air (black), half immerged in water (red) and fully immerged in water (blue)
Figure 12:
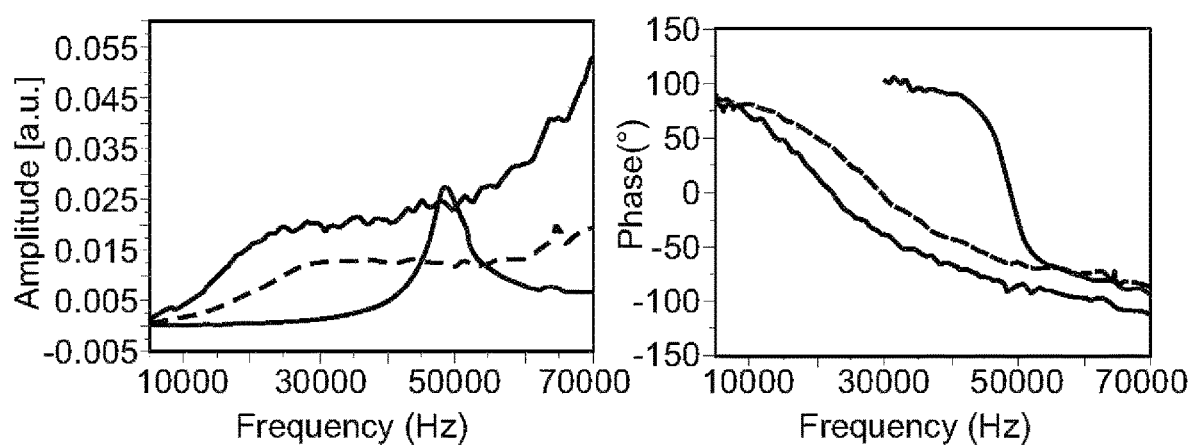
Figure 13:
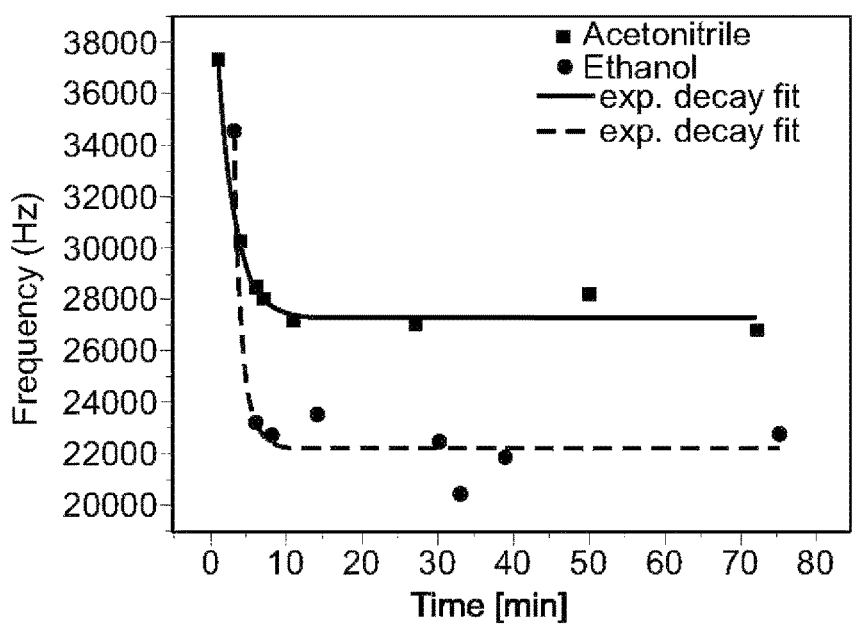
FIG. 13: Online resonant frequencies in acetonitrile (black) and ethanol (red)

A water droplet was placed on a glass slide under the cantilever beam. The cantilever beam was then carefully brought into contact with the water droplet until the whole cantilever was immersed in liquid (FIG. 12). The resonant frequency recorded in air was found to be 48.1 kHz where a clear peak with corresponding phase could be measured. By immersing half the length of the cantilever in water the resonant frequency drops to 27.5 kHz and further to 20.2 kHz when completely immersed in water. This frequency drop resulted from the surrounding fluid which was forced into motion with the cantilever and can be seen as the displaced fluid mass. 16 Furthermore, the amplitude of the resonant peak was wider for the cantilever when it was immersed in water, which made the analysis of the amplitude peaks challenging, since an amplitude peak is not clearly visible. Therefore, the resonant frequency was not extracted from the amplitude of recorded frequency spectra but from the corresponding phase, which showed a shift of 90° at resonance. The feasibility of using the phase for the analysis of resonant frequencies was studied already by Boudjiet et al., who showed that the phase spectrum results in lower noise. 17 The data were fitted a sigmoidal Boltzmann function, as described by Sepulveda and co-workers.18 The inflection points ($\triangleq$ 90° phase shift) of fitted data were evaluated by analyzing the 2nd order derivative (f"=0). Also, the quality factor of the cantilever could be calculated by analyzing the phase spectrum (the two frequencies corresponding to a phase shift of +45 and −45 degrees.) and was found in air to Qair: 10 and dropped in water to Qliquid: ~2. This reduction of the quality factor can be attributed to a dissipative force acting on the cantilever beam. The surrounding liquid medium is not necessarily in phase with the cantilever motion which results in an energy dissipation and a decrease of the quality factor.19 Low Q values are classically obtained when MEMS are immersed in liquids and limit the sensitivity in liquid environments.

f. Dynamic Characterization of the Through-Fiber Fabricated Cantilever in Organic Solvents The dynamic response of through-fiber fabricated cantilevers was evaluated for different organic solvents. It is a well-known effect that polyacrylates can, depending on their composition and physical characteristics, swell to a certain extent. In following section the dynamic response of a cantilever beam immersed in acetonitrile and ethanol was followed online for more than 60 minutes (FIG. 12. The resonant frequency of the through-fiber fabricated cantilever beam was found in air at 58 kHz and dropped by more than half of this initial value. For both tested solvents, acetonitrile and ethanol, the resonant frequency dropped drastically in the first ~10 minutes of the measurement, before it stabilized after approximately 20 minutes. The resonant frequency obtained in ethanol showed significantly lower values than in acetonitrile (see FIG. 13).

The dynamic response of cantilevers in liquid environment depends on different parameters such as viscosity and mass density. However, in the present case the mass density of ethanol and acetonitrile is almost the same and also the different viscosity values (see Table 2) should not contribute in that extend to a frequency drop. The response might be due to changes of the Young's modulus and also experimental conditions (evaporating droplet, surface tension) might influence the measurement.

The damping effect of different solvents was found to be quite similar and showed a decrease of the resonant frequency to about 50% of the value obtained measured in air. The solvents acetonitrile, ethanol and toluene have a similar mass density but different dynamic viscosity values, which is one of the main driving forces of the damping effect.

Consequently, the frequency of the cantilever beam was more affected by ethanol which had the lowest viscosity value of tested solvents. Interestingly the frequency drop was less pronounced for water than for acetonitrile or toluene, although water has a higher mass density and viscosity. For super-hydrophobic surfaces it is well known that the static friction is reduced, which would lead to less damping. However, for the present case this is unlikely since the material poly(PETIA) is, due to its polar hydroxyl-groups, not very hydrophobic. Nevertheless, the solvent penetration might be less pronounced for water than for the other solvents.

Furthermore, the effect of static friction is low compared with the effect of the mass density and viscosity. The observation of less damping in water might be an effect of the surface tension of the liquids. As indicated before, the time dependent measurements were not stable due to the evaporation of the solvents.

The effect of surface tension may also contribute to the damping effect.

g. Operation of the Through-Fiber Fabricated Cantilever in Viscous Liquid

For the experimental part the dynamic response of a though-fiber fabricated cantilever was evaluated in water with increasing concentrations of the more viscous and dense solvent ethylene glycol. The mass density of the sample solutions was calculated and the dynamic viscosity measured with a viscometer. The results are displayed in FIG. 14.

The mass density of the sample mixture can be easily calculated by the ratio of the sample composition. The viscosity of the samples however showed an exponential increase with increasing ethylene glycol amount.

The mass density of the sample mixture can be easily calculated by the ratio of the sample composition. The viscosity of the samples however showed an exponential increase with increasing ethylene glycol amount.

Figure 14A:
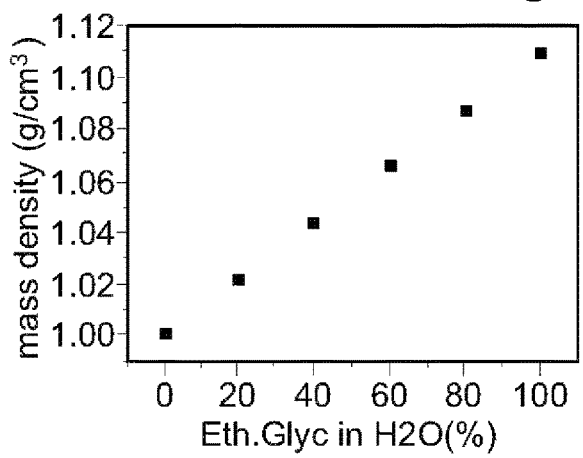
FIG. 14: Mass density (14a) and dynamic viscosity of water with increasing concentration of ethylene glycol (14b)
Figure 14B:
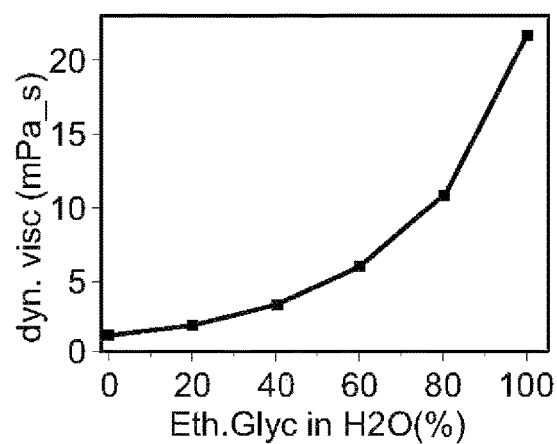
Figure 15A:
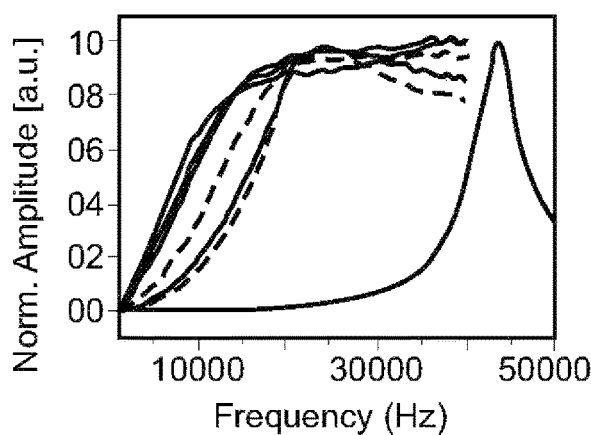
FIG. 15: (15a) Amplitude and (15b) phase measured in air (dry) and with increasing amount of ethylene glycol in water. (The number behind the colour code represents the percent of water in the sample).
Figure 15B:
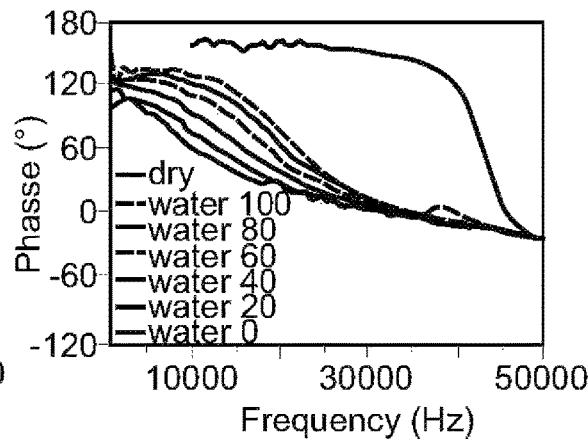

The resonant frequency of a through-fiber fabricated cantilever was measured in air and in prepared sample solutions and are displayed in FIG. 14.

From obtained graphs it can be seen that the resonant frequency shifts towards lower values with increasing mass density and viscosity. Additionally, the peak of the amplitude became less pronounced before it completely vanished (sample water 40). The evaluation of the resonant frequency was carried out by analyzing the phase and summarized together with theoretical calculated values in Table 2.

TABLE 2

| Fluid | f (Hz) exp | Q exp | f (Hz) (theor) | Qfluid | Qtotal |
|---|---|---|---|---|---|
| Air | 43387 | 10.75 | 43379 | 120 | 9.23 |
| Water | 20735 | 1.56 | 21247 | 1.82 | 1.54 |
| Water (80%) | 19294 | 1.29 | 18809 | 1.54 | 1.34 |
| Water (60%) | 17414 | 1.05 | 15207 | 1.27 | 1.13 |
| Water (40%) | 13638 | 0.689 | — | — | — |
| Water (20%) | 9648 | — | — | — | — |
| Ethylene Glycol | 7907 | — | — | — | — |

Experimental and theoretical results of the dynamic response of a through-fiber patterned or fabricated cantilever in water with increasing ethylene glycol concentration.

Obtained quality factors of experimental and theoretical data were in a similar good agreement with each other.

The invention claimed is:

1. Sensor device comprising an optical fiber to be coupled with a laser beam, a through-fiber fabricated cantilever beam (11) onto one end of said optical fiber and having one free end, and a light collector, characterized in that said through-fiber fabricated cantilever beam comprises a patterned photo-polymer.

2. Sensor device according to claim 1, wherein the light collector is a photodiode.

3. Sensor device according to claim 1, wherein at least part of the through-fiber fabricated cantilever beam is treated with a coating chosen among a metal or a polymer.

4. Sensor device according to claim 1, wherein the through-fiber fabricated cantilever beam is partially or totally functionalized.

5. Method for the measurement of at least one parameter with the sensor device of claim 1, comprising the following steps:
   a. Injecting a laser beam into the optical fiber of the sensor device;
   b. Measuring the light intensity of the light reflected from the through-fiber fabricated cantilever beam with a photodiode.

6. Method according to claim 5, further comprising remote means for collecting the light emerging from the optical fiber.

7. Method according to claim 6, wherein said at least one parameter is the temperature, the mass, the viscosity of liquids, the analyte concentration and the degree of a polymerization process.

8. Method for the measurement of at least one parameter with the sensor device of claim 1, comprising the following steps:
   a. Injecting a laser beam into the optical fiber of the sensor device;
   b. Collecting the light emerging from the free end of the through-fiber fabricated cantilever beam, and
   c. Analyzing the emerged light to determine the value of the said at least one parameter.

9. Sensor device according to claim 1, wherein the through-fiber fabricated cantilever beam comprises PETIA.

* * * * *